(12) United States Patent
Toribio et al.

(10) Patent No.: US 9,607,633 B1
(45) Date of Patent: Mar. 28, 2017

(54) SHINGLED MAGNETIC RECORDING INTERBAND TRACK PITCH TUNING

(71) Applicant: Seagate Technology LLC, Cupertino, CA (US)

(72) Inventors: Jose Mari Corral Toribio, Singapore (SG); Song Wee Teo, Singapore (SG); Teck Khoon Lim, Singapore (SG)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/091,945

(22) Filed: Apr. 6, 2016

(51) Int. Cl.
- *G11B 5/09* (2006.01)
- *G11B 20/12* (2006.01)
- *G11B 20/18* (2006.01)

(52) U.S. Cl.
CPC ............ *G11B 5/09* (2013.01); *G11B 20/1217* (2013.01); *G11B 20/182* (2013.01); *G11B 2020/1238* (2013.01); *G11B 2020/1242* (2013.01); *G11B 2020/1292* (2013.01)

(58) Field of Classification Search
None
See application file for complete search history.

(56) References Cited

U.S. PATENT DOCUMENTS

| | | | |
|---|---|---|---|
| 6,185,063 B1 | 2/2001 | Cameron | |
| 6,411,461 B1* | 6/2002 | Szita | G11B 5/59633 360/48 |
| 6,437,947 B1 | 8/2002 | Uno | |
| 7,082,007 B2 | 7/2006 | Liu et al. | |
| 7,408,731 B2 | 8/2008 | Uemura et al. | |
| 7,417,813 B2 | 8/2008 | Lim et al. | |
| 8,014,097 B1 | 9/2011 | Sanvido | |
| 8,190,945 B2 | 5/2012 | Nadeau et al. | |
| 8,599,507 B2 | 12/2013 | Sanvido et al. | |
| 8,638,514 B2 | 1/2014 | Sato et al. | |
| 8,736,995 B1* | 5/2014 | Wiesen | G11B 5/59694 360/27 |
| 8,797,672 B2 | 8/2014 | Tanabe et al. | |
| 8,817,400 B1 | 8/2014 | Nangare et al. | |
| 8,867,161 B2 | 10/2014 | Emo et al. | |
| 2003/0081338 A1* | 5/2003 | Wang | G11B 5/012 360/66 |
| 2004/0125497 A1* | 7/2004 | Schmidt | G11B 19/04 360/77.08 |
| 2006/0082912 A1* | 4/2006 | MacKelden | G11B 5/41 360/31 |
| 2007/0247738 A1* | 10/2007 | Yamagishi | G11B 5/09 360/75 |
| 2007/0253096 A1* | 11/2007 | Alfred | G11B 5/5526 360/78.04 |

(Continued)

*Primary Examiner* — Peter Vincent Agustin

(74) *Attorney, Agent, or Firm* — Hall Estill Attorneys at Law

(57) ABSTRACT

Method and apparatus for positioning shingled magnetic recording (SMR) tracks on a rotatable data storage medium. In some embodiments, a first band of partially overlapping tracks is written the medium at a first track pitch. An adjacent, second band of partially overlapping tracks is written to the medium at the first track pitch. The second band has a first written track at a second track pitch with respect to a last written track in the first band. The second track pitch is determined in response to an error rate established for a test track using an adjacent track written at the first track pitch.

20 Claims, 7 Drawing Sheets

(56) References Cited

U.S. PATENT DOCUMENTS

2010/0118672 A1* 5/2010 Yamamoto ........... G11B 7/0053
                                                    369/47.14
2011/0075286 A1* 3/2011 Duan .................... G11B 5/012
                                                    360/31

* cited by examiner

DOUBLE SIDED TRACK SQUEEZE (TPIC-DSS)

INNER DIAMETER SINGLE SIDED TRACK SQUEEZE (TPIC-ID-SS)

OUTER DIAMETER SINGLE SIDED TRACK SQUEEZE (TPIC-OD-SS)

SHINGLED MAGNETIC RECORDING INTERBAND TRACK PITCH TUNING

SUMMARY

Various embodiments of the present disclosure are generally directed to a method and apparatus for positioning shingled magnetic recording (SMR) tracks on a rotatable data storage medium.

In some embodiments, a first band of partially overlapping tracks is written the medium at a first track pitch. An adjacent, second band of partially overlapping tracks is written to the medium at the first track pitch. The second band has a first written track adjacent a last written track in the first band at a second track pitch. The second track pitch is determined in response to an error rate established for a test track using an adjacent track written at the first track pitch.

In other embodiments, a method has sequential steps of writing a test pattern to a test track using a data transducer adjacent a rotatable data recording medium; writing a first adjacent track that partially overlaps the test track in a first radial direction of the medium at a first track pitch value; while maintaining the first adjacent track at the first track pitch with respect to the test track, performing steps of writing a second adjacent track that partially overlaps the test track in an opposing second radial direction of the medium, measuring an initial error rate value from the test track, and repetitively advancing the second adjacent track toward the test track by rewriting the second adjacent track and determining an updated error rate value from the test track until a specified error rate value for the target track is reached at a final squeeze distance for the second adjacent track; determining a second track pitch value responsive to the final squeeze distance; and writing first and second bands of partially overlapping tracks to the medium, each of the tracks in the respective first and second bands written at the first track pitch, a last track in the first band and a first track in second band written at the second track pitch.

In further embodiments, a data storage device includes a data read/write transducer controllably positionable adjacent a rotatable data recording medium. A control circuit is configured to write a first band of partially overlapping tracks to the medium at a first track pitch comprising a distance between a center of a first track and a center of a second track in said first band, and to subsequently write an adjacent second band of partially overlapping tracks to the rotatable recording medium at the first track pitch, the second band of partially overlapping tracks comprising a first written track adjacent a last written track in the first band of partially overlapping tracks. The first written track in the second band is placed by the control circuit at a second track pitch from the last written track in the first band greater than the first track pitch. A track pitch determination circuit is configured to select the first track pitch using a single sided track squeeze operation and configured to select the second track pitch using a double sided track squeeze operation that maintains a first adjacent track at the first track pitch with respect to a target track while adjusting a position of an opposing second adjacent track with respect to the target track.

These and other features of various embodiments can be understood with a review of the following detailed description in conjunction with the accompanying drawings.

DETAILED DESCRIPTION

Figure 1:
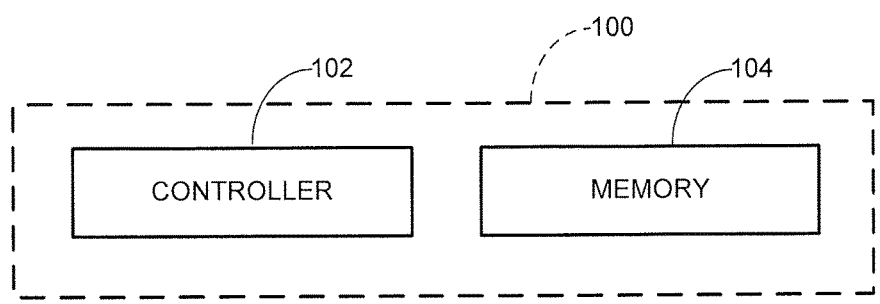
FIG. 1 is a simplified functional block diagram of a data storage device constructed and operated in accordance with various embodiments of the present disclosure.

The present disclosure is generally directed to data storage systems, and more particularly to a method and apparatus for enhancing arrangements of data tracks on a data recording surface, such as a magnetic recording disc in a data storage device.

Data storage devices store and retrieve data from a host device in a fast and efficient manner. Such devices are often provided with a top level control circuit (controller) and one or more forms of data storage media, such as rotatable magnetic recording media (discs) used in hard disc drives (HDDs) and hybrid data storage devices (HDSDs).

HDDs and HDSDs generally arrange the rotatable magnetic recording media so as to rotate at a constant angular velocity. A corresponding array of data read/write transducers (heads) move across the recording surfaces of the media to write and read data to fixed sized sectors arranged along concentric data tracks. Embedded servo data may be supplied on the recording surfaces to provide positional information used by a servo control circuit to maintain the transducers in a desired relation to the data tracks.

Shingled magnetic recording (SMR) techniques can be used to enhance the data storage capacity of a rotatable medium. Generally, SMR techniques involve writing data to a recording surface in such a way that subsequently written tracks of data partially overlap previously written tracks. The data tracks may be arranged into bands of concentric tracks. Small inter-band gaps may be provided between adjacent bands.

It is common for the write element in a data transducer to have an effective magnetic field write width that is substantially greater than the effective magnetic sensing read width of the associated read element. This allows a first track to be written with an initial, relatively wider width established in relation to the width of the write element. A second track having the same width as the first track may be written that overlaps a portion of the first track. The portion of the first track that is not overwritten becomes the final first track and has a final width that is generally equal to or slightly greater than the width of the read element. A third track is next written that partially overwrites the second track to define the final second track, and so on.

In some cases, the write element may have an asymmetric magnetic field write response such that a fringing field on one side of the write element is relatively wider than the fringing field on the opposing side of the write element. The asymmetric write response may be a function of the construction of the write element. The use of a rotary actuator can induce changes in skew angle between the read and write element across the radius of the medium, and changes in skew angle can also induce and/or change write asymmetry.

For a given radial position on the medium, the direction of writing may be selected such that the portion of a previous track that is overwritten by a subsequent track is that portion associated with the side of the transducer having the wider fringing field. Some SMR writing schemes employ different directions of overwriting at different radial locations of the medium.

The use of SMR can increase the data storage capacity of a magnetic recording surface. Narrowing the widths of the final tracks to match the read element width allows more data tracks to be placed within a given area. However, SMR write techniques can also suffer a number of limitations.

One limitation that has been observed is an increase in a bit error rate (BER) value for the first track written in each band. Unlike the remaining tracks in the band that are overwritten (squeezed) by only a single adjacent track, the first track in each band is usually immediately adjacent the last written track in the next band. It follows that the first track in each band may be squeezed from two opposing directions; that is, the first written track in each band may be partially overwritten by both the second track in the band and the last track in the adjacent band. Thus, the rewriting of the last track in a selected band may inadvertently overwrite the first track in the next adjacent band to an extent that recovery from the latter track is adversely affected.

Accordingly, various embodiments disclosed herein are generally directed to an apparatus and method for carrying out shingled magnetic recording to a data storage medium. As explained below, some embodiments employ a control circuit that operates to write a first band of partially overlapping tracks to a rotatable recording medium at a first track pitch comprising a distance between a center of a first track and a center of a second track in the first band.

The control circuit further operates to write an adjacent second band of partially overlapping tracks to the rotatable recording medium at the first track pitch. The second band of tracks is provided with a selected spacing relative to the first band of tracks such that a second, greater track pitch is provided between the last track in the first band and the second track in the second band.

The first and second track pitch values are obtained by carrying out various track squeeze analyses. It is contemplated that these analyses are carried out during device manufacturing, although such is not limiting as the analyses can alternatively or additionally be performed during field use of the device in a customer environment. The analyses are respectively characterized as single sided track squeeze operations, and as double sided track squeeze operations.

As explained below, in some embodiments the single sided track squeeze operations involve writing a test track at a selected location, followed by writing an adjacent track from a selected side of the test track. An innermost diameter (ID) single sided track squeeze operation writes the adjacent track on the side of the test track in the direction of the ID of the medium. An outermost diameter (OD) single sided track squeeze operation write the adjacent track on the side of the test track in the direction of the OD of the medium. Each of these operations may be performed in turn to the same test track.

The successively written adjacent tracks are written closer and closer to the test track and an error rate value is determined for the test track each time. An overall squeeze (SQZ) value, characterized as a track pitch distance from the center of one track to the next, is determined that provides an error rate value that corresponds to a predetermined threshold. It is contemplated that as this testing continues, a partial overlap of the test track by the encroaching tracks will take place. As needed, the test track may be rewritten as needed, including each time the adjacent track is moved.

In some embodiments, the larger of the two squeeze values for the single sided track squeeze operation is selected for use as the first track pitch value for use in each band to be written in the vicinity of the test track. The direction of shingling of the tracks (e.g., toward the ID or toward the OD) is also selected based on the selected squeeze value.

Thereafter, another test track is written and a first adjacent track is written next to the test track. The first adjacent track is at the selected track pitch and in the selected direction. A double sided track squeeze operation is performed by writing a second adjacent track opposite the first adjacent track. As before, the second adjacent track is moved closer and closer to the test track until the specified error rate value is reached. The second track pitch value is selected based on the location of the second adjacent track. This value may be derated by a small constant value to account for system variables (e.g., offtrack writing errors, etc.).

In this way, both intraband track pitch within each band of shingled tracks (TP1) and interband track pitch between adjacent bands of shingled tracks (TP2) can be efficiently and effectively selected. It has been found that the disclosed embodiments can achieve improved error rate performance for the first track in each band while increasing overall track density on a medium.

These and other features and advantages of various embodiments of the present disclosure can be understood beginning with a review of FIG. 1, which provides a simplified functional block representation of a data storage device 100. The device 100 includes a controller (control circuit) 102 and a memory module 104. The controller 102 is a hardware or programmable processor based control circuit that provides top level communication and control functions as the device interfaces with the host device.

Data from the host device is transferred for storage in the memory 104. The memory can take a variety of forms, including rotatable magnetic recording media as set forth in FIG. 2.

Figure 2:
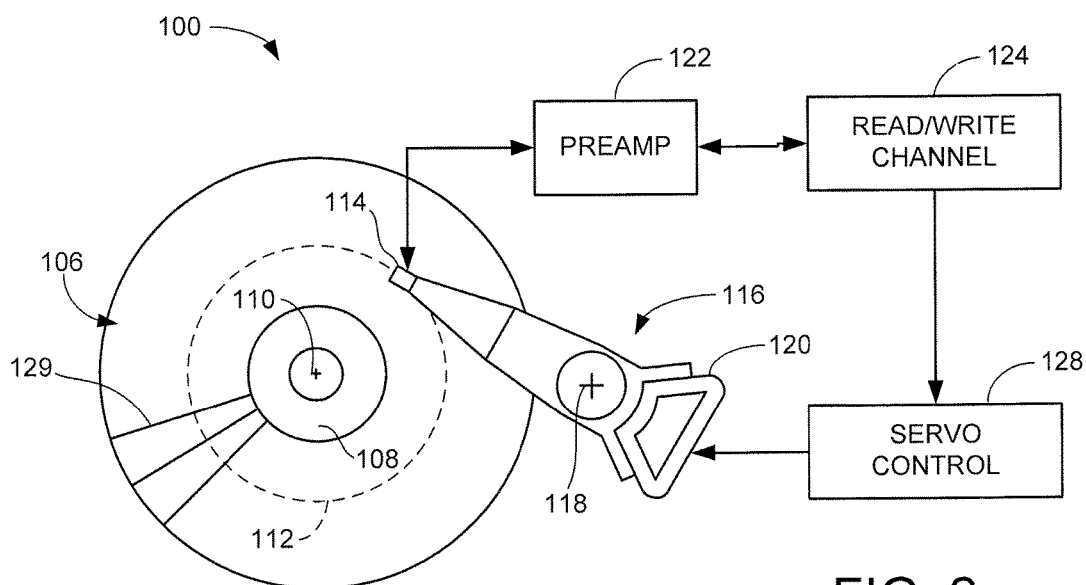
FIG. 2 is a schematic representation of aspects of the data storage device of FIG. 1 characterized as a hard disc drive (HDD) in accordance with some embodiments.

FIG. 2 is a schematic representation of the data storage device 100 of FIG. 1 in accordance with some embodiments. The device 100 in FIG. 2 is characterized as a hard disc drive (HDD) although other forms of devices can be utilized, such as hybrid data storage devices (HDSDs). As will be recognized, HDSDs tend to utilize different forms of non-volatile memory storage, such as rotatable magnetic recording discs and solid-state semiconductor memory (e.g., flash memory, etc.).

The device 100 in FIG. 2 includes one or more rotatable magnetic recording media 106 that are rotated by a spindle motor 108 at a constant high velocity about a central axis 110. A plurality of concentric tracks (one denoted at 112) are defined on the various disc recording surfaces and accessed by a corresponding array of data read/write transducers (heads) 114.

The heads 114 are supported by a rotary actuator assembly 116 which pivots about a central actuator axis 118 adjacent an outermost perimeter of the discs 106. A coil 120 of a voice coil motor (VCM) is immersed in a magnetic field by an array of permanent magnets (not shown). Controlled application of current to the coil 120 induces controlled rotation of the actuator 116 about axis 118 and radial movement of the heads 114 across the disc surfaces.

Figure 3:
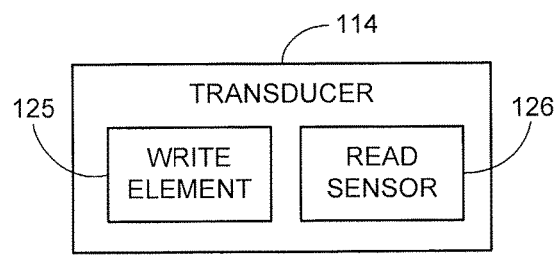
FIG. 3 is a functional block representation of a transducer (head) of FIG. 2.

A preamplifier/driver circuit (preamp) 122 is operably coupled to each of the heads 114 and may be mounted, for example, to a side of the actuator assembly 116. Data transfers between a host device and the discs 106 are carried out using the preamp 122 and a read/write channel 124. During a data write operation, data to be written to the discs is buffered from the host in a buffer memory (not shown), and encoded by the read/write channel 124 to supply a frequency modulated write signal which is supplied to the preamp 122. The preamp 122 generates and applies bi-directional write currents to a write element 125 of the associated head 114 (see FIG. 3) to write the data in the form of a sequence of magnetic flux transitions in a recording layer of the associated disc.

During a subsequent read operation, a read sensor 126 (FIG. 3) is aligned with a corresponding track 112 on which the data to be retrieved are resident. The head 114 outputs a readback signal which is preconditioned by the preamp 122 and processed by the read/write channel 124 to recover the originally written data. The readback data are placed in the buffer memory pending transfer to the requesting host device.

A servo control circuit is denoted in FIG. 2 at 128. The servo control circuit 128 provides closed loop positional control of the respective heads 114 during read and write operations. Generally, demodulated servo data transduced from the disc surface is supplied to the servo control circuit 128 to provide an indication of the relative position of the associated head with a given track. As explained below, the servo data may be arranged as servo wedges 129 that extend across the surface of the disc 106, much like spokes on a wheel. Three such wedges are shown in FIG. 2, although it will be recognized that the wedges circumferentially extend around the entire periphery of the disc. A typical number of wedges may be 200-400, etc.

The servo control circuit 128 outputs a current command signal to the coil 120 to adjust the position of the head based on a commanded target position. The servo circuit 128 can be adapted to operate in a number of different servo positioning modes, including a seek mode in which a selected head is moved from an initial track to a target track, and a track following mode in which the associated head is caused to follow a selected track.

Figure 4:
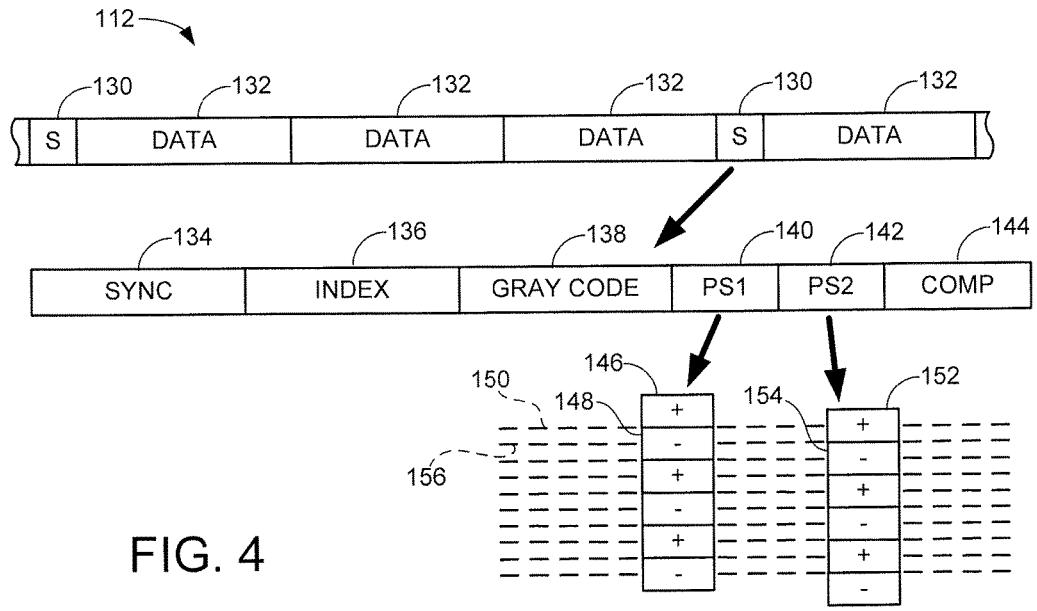
FIG. 4 shows an exemplary format for servo and data tracks defined on the data recording surface of FIG. 2.

FIG. 4 shows an arranged of the exemplary track 112 from FIG. 2 in accordance with some embodiments. Other arrangements can be used. A number of spaced apart servo (S) fields 130 form the radially arranged servo wedges 129 from FIG. 2. Regions between adjacent pairs of the servo fields 130 are used to define a series of data blocks, or data sectors 132. The data sectors each store a fixed amount of encoded user data, such as 512 bytes, etc.

An exemplary format for each servo field 130 is shown in FIG. 4 to include a synchronization (sync) field 134, an index field 136, a Gray code (track ID) field 138, servo positioning fields PS1 and PS2 140, 142, and a compensation field 144. Other formats can be used. Generally, the sync field 134 is a unique bit sequence to signal to the servo circuit passage of a servo field 130 adjacent the transducer 114. The index field 136 signifies the angular position of the servo field, and the Gray code field 138 signifies the radial position of the servo field on the disc surface.

The PS1 and PS2 fields 140, 142 are alternating servo burst fields with variable polarities as shown. For example, the PS1 fields 140 are each arranged as radially aligned positive (+) burst fields 146 and negative (−) burst fields 148. Servo nulls 150 are defined at the juncture between each adjacent pair of the bursts 146, 148.

Similarly, the PS2 fields 142 are each arranged as radially aligned positive (+) burst fields 146 and negative (−) burst fields 148. Servo nulls 156 are defined at the junction between each adjacent pair of the bursts 152, 154. The PS1 and PS2 fields are radially offset to define the nulls 150, 156 at half-track locations.

Figure 5:
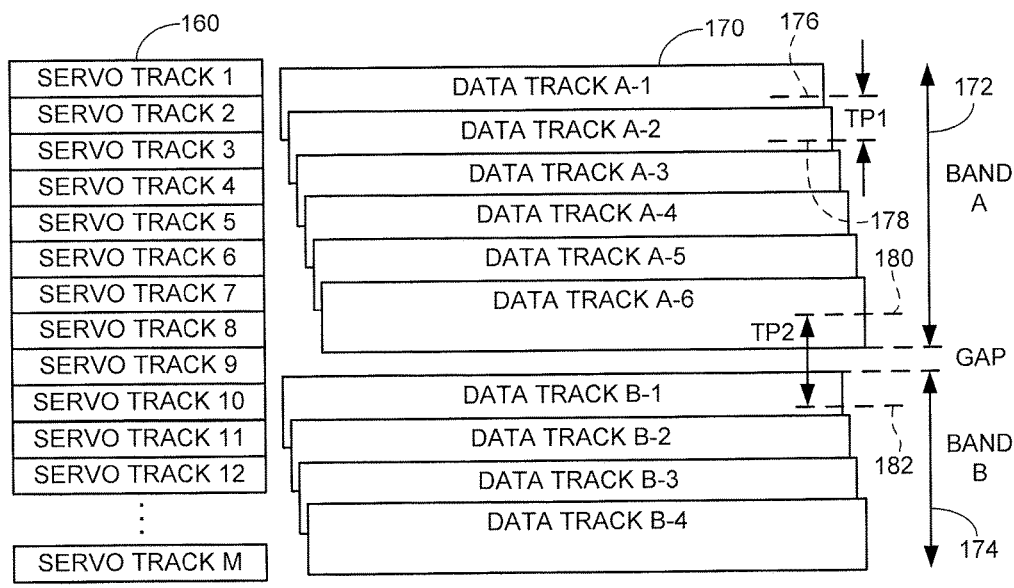
FIG. 5 shows a relationship between servo tracks and shingled magnetic recording (SMR) data tracks on the recording surface of FIG. 2 in accordance with some embodiments.

FIG. 5 depicts a number of so-called servo tracks 160 formed from the servo fields 130 of FIG. 4. Generally, each servo track 160 may be viewed as having a centerline nominally corresponding to the servo nulls 150, and boundaries defined by the servo nulls 156. Other conventions can be used.

Shingled magnetic recording (SMR) is contemplated as being utilized by the device 100 of FIG. 2 for at least some of the data recording surface area of disc 106. Accordingly, FIG. 5 shows two bands of partially overlapping data tracks 170: a first band 172 (Band A) and a second band 174 (Band B). A small gap is provided between the first and second bands. The relative sizes and spacings of the respective elements in FIG. 5 are merely relational for purposes of illustration and may be adjusted as required.

The first band 172 (Band A) has a total of six (6) tracks 170, denoted for convenience as tracks A-1 through A-6. The second band (Band B) has a total of four (4) tracks 170, denoted as tracks B-1 through B-4. It will be noted that the respective bands can have any suitable respective numbers of tracks. While both bands are shown to be shingled in a selected direction (e.g., toward the OD of the disc 106), such is merely exemplary and is not necessarily limiting.

FIG. 5 further shows different track pitch values utilized by the respective bands 172, 174. A first track pitch value (TP1) represents an intraband track pitch value for tracks in each band. For reference, the track pitch nominally corresponds to the radial separation distance from a center of a first track in the band (such as track A-1) to the center of a second track in the band (such as track A-2). It will be noted that the track pitch as used herein is the written-in track pitch; that is, the centers of the tracks as initially written.

More particularly, during the writing of data track A-1, the servo control circuit 128 utilizes the positional information from the adjacent servo tracks 160 to position the write element (126, FIG. 3) at the radius defined by broken line 176, thereby nominally writing track A-1 with this centerline. The servo control circuit 128 subsequently uses the servo tracks 160 to position the write element at the radius defined by broken line 178, thereby writing the data track A-2 with line 178 as its centerline, and so on until the last data track A-6 is written. As noted above, track A-6 is not partially overlapped by the other tracks in the band 172.

Each adjacent pair of the tracks A-1 through A-6 is nominally written at this first track pitch value TP1.

FIG. 5 further shows a second track pitch value (TP2). The TP2 value represents an interband track pitch for the last track in Band A (e.g., track A-6) and the first track in Band B (e.g., track B-1). It is noted that TP2 is greater than TP1 (TP2>TP1) and can be generally defined as the distance from the written centerline of track A-6 (line 180) to the written centerline of track B-1 (line 182).

While not necessarily limiting, bands of tracks such as Bands A and B shown in FIG. 5 are often written on-the-fly to store relatively large data sets. For example, the storage device 100 may receive a streamed write command to write a set of data involving many sectors (e.g., 132, FIG. 4) that will span multiple tracks. In response, the device 100 may operate to initiate the data transfer by writing the tracks in turn until the entire data set has been recorded to the disc 106. The data set may thereafter be managed as a unit. In other embodiments, the sizes and locations of bands are predetermined and filled as necessary as new data are provided to the device.

Bands are often written sequentially in the direction of shingling. In this way, under normal circumstances the data set corresponding to Band A in FIG. 5 would be written first, followed by the data set corresponding to Band B.

Updates to selected sectors within a given band can be performed by the device 100. Depending on the location of the data sectors, some or all of the tracks in the band may need to be read, temporarily stored in local memory (e.g., a data buffer, etc.) and then rewritten. For example, should a selected sector (or sectors) on track A-2 need to be updated, the contents of tracks A-3 through A-6 may be buffered, the updated data written to track A-2, and then tracks A-3 through A-6 may be rewritten to the medium.

Generally, updates to the final track in a band (e.g., track A-6) do not normally require the buffering and rewriting of tracks in the band. However, it will be noted that the rewriting of the last track in a given band, such as track A-6 in Band A, will tend to partially overlap (squeeze) the first track in the adjacent band, such as track B-1 in Band B. In a potentially adverse scenario, the updating of track A-6 (e.g., the last track in Band A), whether once or many times, may require the rewriting of all of the data in Band B (either in place or in a new, different location on the disc 106).

Figure 6:
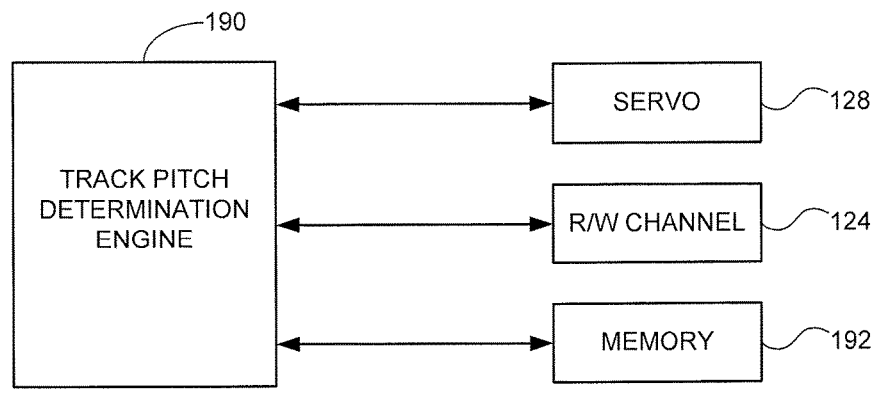
FIG. 6 is a functional block diagram of a track pitch determination engine constructed and operated in accordance with some embodiments to establish track pitch values depicted in FIG. 5.

FIG. 6 is a functional block diagram for a track pitch determination engine 190 constructed and operated in accordance with various embodiments to establish the respective first and second track pitch values (TP1 and TP2) from FIG. 5.

The engine 190 can take a variety of forms, but generally comprises a control circuit that is integrated into the storage device or that communicates with the storage device using a suitable host interface. In some embodiments, the engine 190 forms a portion of the top level controller circuit of the device 100 (e.g., controller 102, FIG. 1), and therefore may be a hardware circuit or programmable processor with associated memory stored in a suitable memory location for execution at appropriate times. In other embodiments, at least portions of the engine may be offloaded in a separate host device such as a computer or other processing device that communicates test protocol data and instructions to the storage device 100.

Generally, the engine 190 communicates with various circuits including the servo circuit 128 and R/W channel 124 from FIG. 2. Data values may be stored in a local memory 192, such as a volatile or non-volatile memory available for this purpose. The final track pitch values may be stored in a non-volatile memory, such as on selected parametric data tracks and recalled as necessary for use by the system in writing bands of tracks to the media. A single set of track pitch values may be identified for use across an entire disc surface, or individual track pitch values (and shingling directions, etc.) may be selected for different regions of each disc surface, taking into account various factors including skew, reader/writer offsets, etc. In some cases, each disc surface may be divided into a plurality of concentric zones or radial regions, and a different set of track pitch values and other parameters are established for use within each zone.

Figures 7A, 7B:
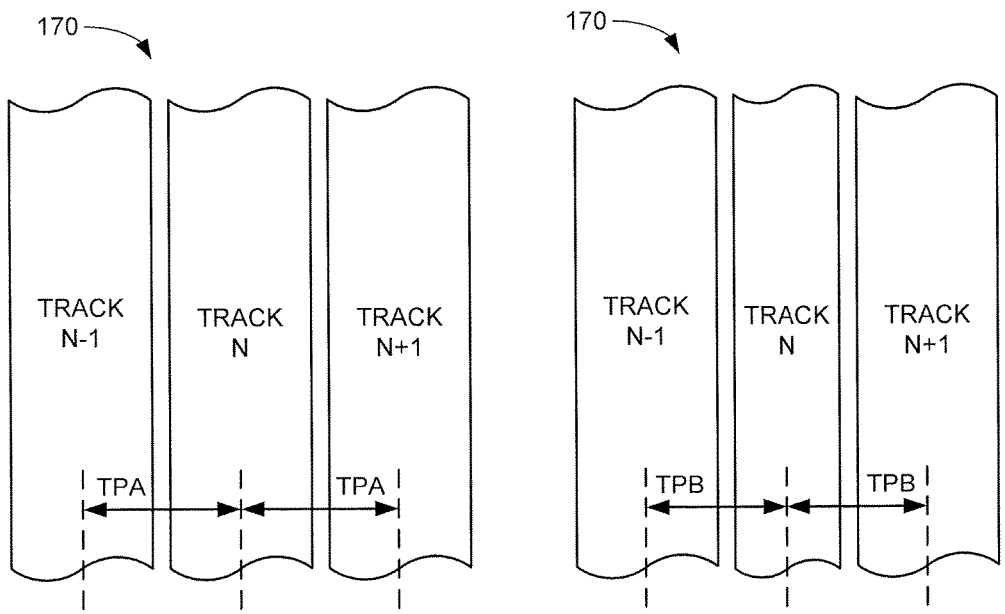
FIGS. 7A-7B show a methodology for performing a double sided track squeeze analysis.

The engine 190 is configured to perform a number of different types of analyses to arrive at the final track pitch values TP1 and TP2 for a given location. FIGS. 7A-7B denote a double sided track squeeze operation that may be carried out by the engine 190 in accordance with some embodiments. The operation is also sometimes referred to as a Track-Per-Inch Capability Double Sided Squeeze (TPIC-DSS) operation. The double sided squeeze operation evaluates a selected track by applying track squeeze from two opposing directions.

As shown in FIG. 7A, three data tracks 170 are denoted as track N−1, track N and track N+1. Track N is also referred to as a target track (or baseline track), and the tracks N−1 and N+1 are referred to as adjacent tracks. Generally, during operation the target track N is written first, followed by the writing of the adjacent tracks N−1 and N+1 on opposing sides of the target track N. The tracks can be written with any suitable data, including a repeating pattern (e.g., a 2T pattern), a random or pseudo-random sequence, actual test data, etc. In some cases, error correction codes (ECC) may be generated for the data and stored on the track(s).

An initial track pitch is selected for the respective tracks. This track pitch is denoted as TPA in FIG. 7A and nominally corresponds to the radial separation distance between the written-in centerlines of tracks N−1 and N and tracks N and N+1. While the present discussion of FIGS. 7A and 7B contemplates that equal and opposite squeeze distances are successively applied, such is not necessarily the case, as explained below. Nevertheless, it is believed helpful to at least initially describe the testing routine in FIGS. 7A-7B using a symmetric progression, as such processing may be useful in some circumstances.

Regardless, once the adjacent tracks N−1 and N+1 have been written, a read operation is performed upon the target track N to assess an error rate value for the data stored thereon. Any number of different forms of error rate values can be used. In some cases, a data sector failure rate (SFR) can be used, such as a count of data sectors on the target track N subjected to at least one read error (either correctable or non-correctable). In other cases, an overall bit error rate (BER) or other metric can be used to assess the read error rate.

If ECC data are written to the target track, the operation of the ECC to detect and correct up to selected numbers of errors can be utilized to form the error rate metric. In other cases, the raw readback data from the target track can be placed in a buffer and a logical comparison operation, such as an exclusive-or (XOR) operation, can be used to compare the readback data with a copy of the data written to the medium to detect bit changes in the readback data. An initial defect scan can be performed prior to the writing of the adjacent tracks to detect and deallocate defective locations so that such defect-based errors are not included in the assessment.

Once the initial error rate value for the target track N has been determined, the engine 190 proceeds to at least rewrite the adjacent tracks N−1 and N+1 at a new, reduced track pitch (TPB), as represented in FIG. 7B. Depending on the application, the target track N may also be rewritten prior to the rewriting of the adjacent tracks. A second error rate is obtained from the target track N based on this new, decreased spacing (squeeze). The foregoing processing continues with greater amounts of double sided track squeeze until the measured error rate reaches a predetermined threshold.

Figure 8A:
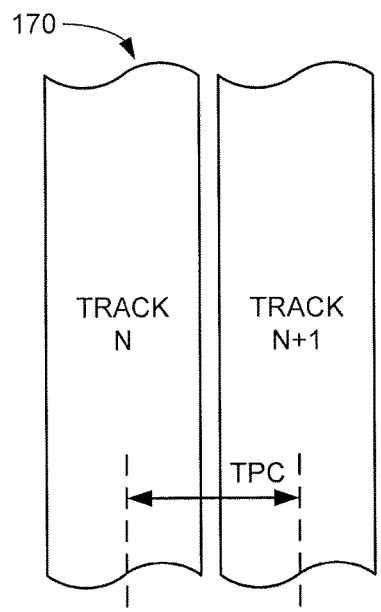
FIGS. 8A-8B show a methodology for performing a single sided track squeeze analysis in a direction from an innermost diameter (ID) on the recording surface.
Figure 8B:
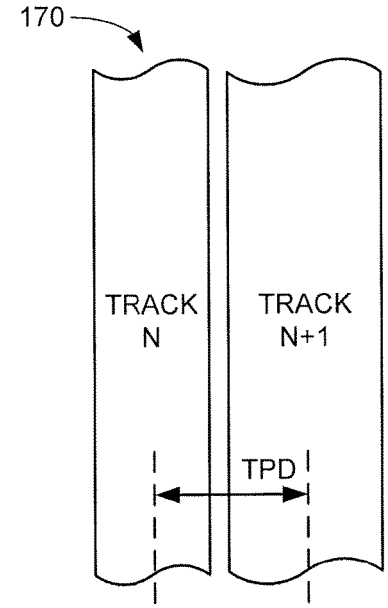

FIGS. 8A-8B illustrate a single sided track squeeze operation that may be carried out by the engine 190 in accordance with some embodiments. The operation is termed an inner diameter (ID) single sided track squeeze operation, or TPIC-IP-SS (Tracks-Per-Inch Capability, Inner Diameter, Single Sided).

In FIG. 8A, the target track N is written, followed by adjacent track N+1 on the ID side of track N (e.g., track N+1 is closer than track N to the center of rotation of the disc 106). Track N+1 is written at an initial track pitch value TPC. As before, an error rate value is determined for track N and the process is repeated, as shown in FIG. 8B where track N+1 is written at a smaller track pitch TPD. This processing continues until the smallest track pitch value is determined from the ID direction that provides an error rate value that meets the predetermined threshold value.

Figure 9A:
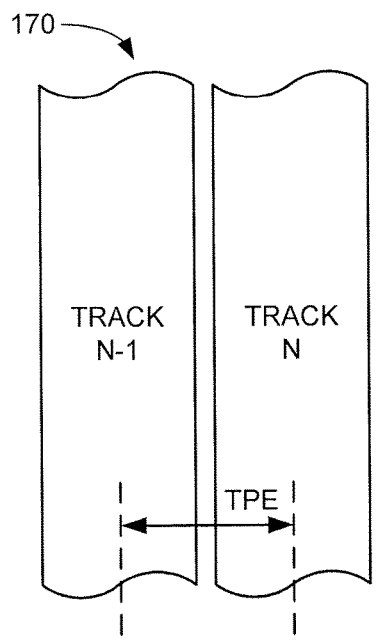
FIGS. 9A-9B show a methodology for performing a single sided track squeeze analysis in a direction from an outermost diameter (OD) on the recording surface
Figure 9B:
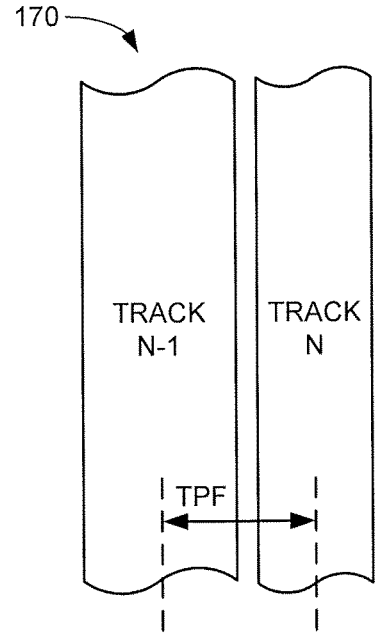

FIGS. 9A-9B show a single sided track squeeze operation carried out from the outer diameter (OD) direction, also referred to as TPIC-OD-SS (Tracks-Per-Inch Capability, Outer Diameter, Single Sided). In this case, track N is written as before, followed by track N−1 (on the OD side of track N) at an initial spacing TPE and an error rate value for track N is measured. The process continues such as shown in FIG. 9B where a smaller spacing TPF is utilized. As before, the minimum spacing is determined that achieves acceptable error rate performance.

Figure 10:
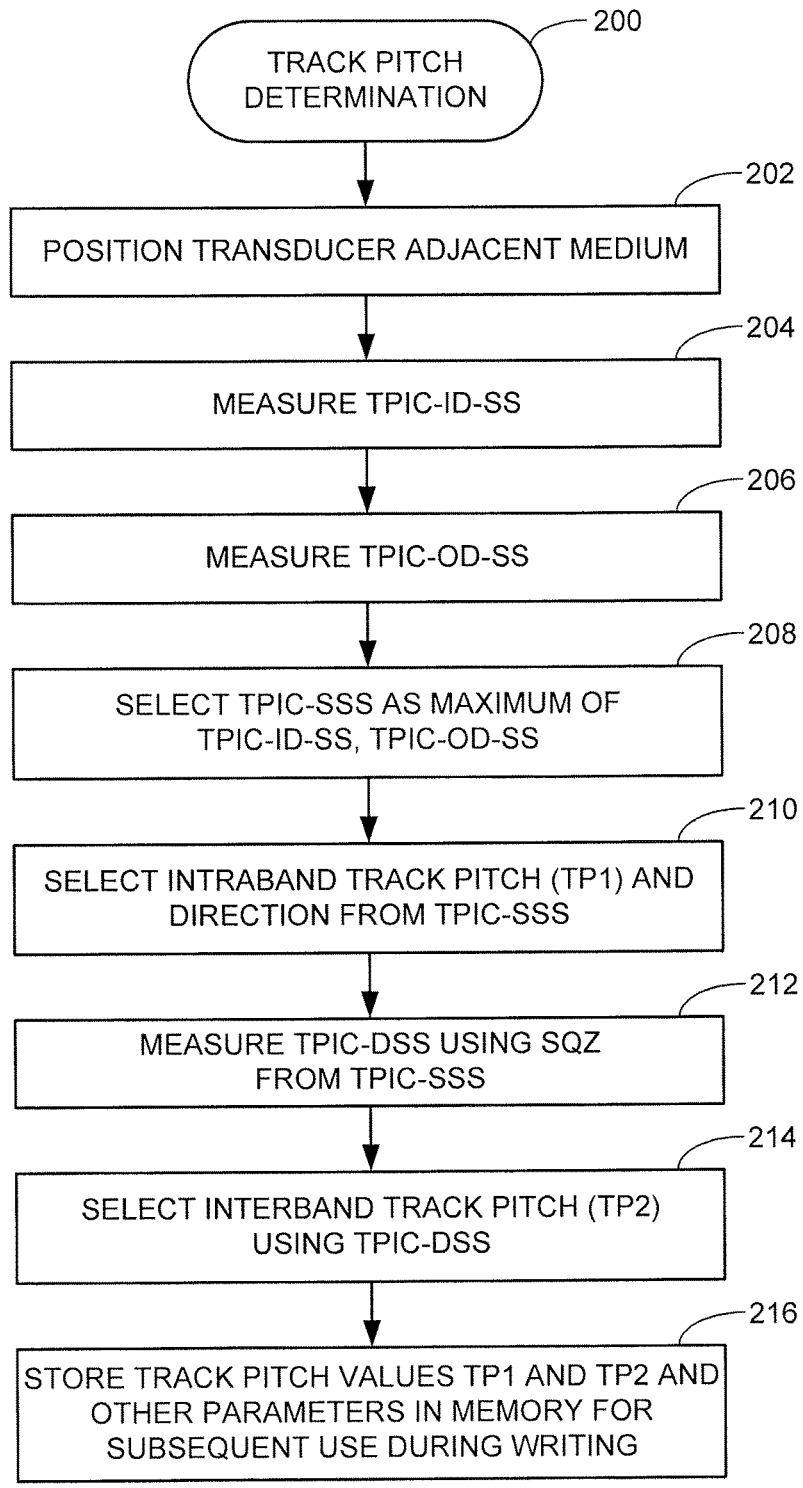
FIG. 10 is a flow chart for a track pitch determination routine illustrative of steps carried out by the track pitch determination engine of FIG. 6 in accordance with some embodiments.

FIG. 10 provides a track pitch determination routine 200 illustrative of steps carried out by the track pitch determination engine 190 of FIG. 6 in accordance with various embodiments. It will be appreciated that the various double and single sided squeeze analyses of FIGS. 7A-9B are carried out by the engine during the operation of the routine. As noted above, in some cases the engine 190 may take the form of a programmable processor, in which case suitable programming instructions can be stored in a memory and executed by the processor to carry out the various steps set forth in the routine.

Initially, the routine 200 is arranged to only evaluate a single location on a particular medium. This has been provided for simplicity of illustration. It will be understood that the various steps can be repeated multiple times at different radial locations for each head/disc combination in a given storage device to accommodate appropriate parametric values for storage in the local memory 192 (FIG. 6).

The routine commences at step 202 where a data transducer (e.g., 114, FIGS. 2-3) is positioned at a selected location adjacent a data recording surface of a rotatable storage medium (e.g., disc 106, FIG. 2). At this point, the engine 190 proceeds to carry out a TPIC-ID-SS measurement at step 204, as discussed above in FIGS. 8A-8B, so that an ID side adjacent track (e.g., N+1) is written adjacent a target track (e.g., N) and successively moved closer until a target error rate is obtained.

In some embodiments, this will provide a track pitch squeeze distance of some selected value, which may be normalized based on a nominal (non overlapping) track pitch value of 1.0. The squeeze distance may further be decreased by the maximum allowable write fault threshold (WFT) distance, which represents a maximum deviation from the nominal track center that a write operation can continue to be executed. A typical WFT value may be, for example, 15% of the track width, so that movement of the head farther than this amount of distance from the center of track results in the declaration of a write fault and a temporary interruption in the further writing of the data.

Using a concrete example, assume that the radial track pitch value obtained during step 204 that results in the threshold error rate is 40% of the nominal track pitch. Stated another way, if TPC in FIG. 8A is set to 100% (TPC=1.0), then TPD in FIG. 8B is nominally 0.4 (TPD=0.4). If the write fault threshold is 15% (WFT=0.15), then the final squeeze value SQZ-PCT can be established as:

$$\text{SQZ-PCT}=\text{TPD}-\text{WFT}=0.4-0.15=0.25 \quad (1)$$

and a value TPIC-ID-SS indicative of the inner direction side squeeze is given as:

$$\text{TPIC-ID-SS}=1.0/(1.0-(\text{SQZ-PCT}))=1.0/0.75=1.33 \quad (2)$$

The routine of FIG. 10 continues at block 206, where the foregoing steps are repeated using an outer diameter single sided squeeze operation, as discussed above in FIGS. 9A-9B. Assuming the final track pitch value TPF from FIG. 9B provides a normalized track pitch value of 60% (TPF=0.6), and WFT remains 15% (WFT=0.15), then $$\text{SQZ-PCT}=\text{TPF}-\text{WFT}=0.6-0.15=0.45 \quad (3)$$

and a value TPIC-OD-SS indicative of the outer direction side squeeze is given as:

$$\text{TPIC-ID-SS}=1.0/(1.0-(\text{SQZ-PCT}))=1.0/0.45=2.22 \quad (4)$$

Next, as shown at step 208 in FIG. 10, a value TPIC-SSS is selected as the maximum value of the previously calculated TPIC-ID-SS and TPIC-OD-SS values, namely:

$$\text{TPIC-SSS}=\text{Max}(\text{TPIC-ID-SS},\text{TPIC-OD-SS})=2.22 \quad (5)$$

so in the present example, the OD squeeze value gave a larger amount of squeeze as compared to the ID value. The intraband track pitch value TP1 (see FIG. 5) is thereafter given as:

$$\text{TP1}=1.0/\text{TPIC-SSS}=1.0/2.22=0.45 \quad (6)$$

In other words, bands of tracks that are subsequently written in the vicinity of the test track N will be written using a nominal track spacing, within each band, of TP1. The direction of shingling will be based on the selected TPIC-SSS value, which in this case is the OD side.

The routine continues at step 212 to perform a double sided squeeze analysis as generally set forth in FIGS. 7A-7B. This double sided squeeze measurement, however, utilizes the TP1 value and direction obtained from step 210. That is, the adjacent track squeeze distance (in this case, the OD adjacent track N−1) is held constant while the other adjacent track squeeze distance (in this case, the ID adjacent track N+1) is reduced to meet the final error rate threshold.

Figure 11:
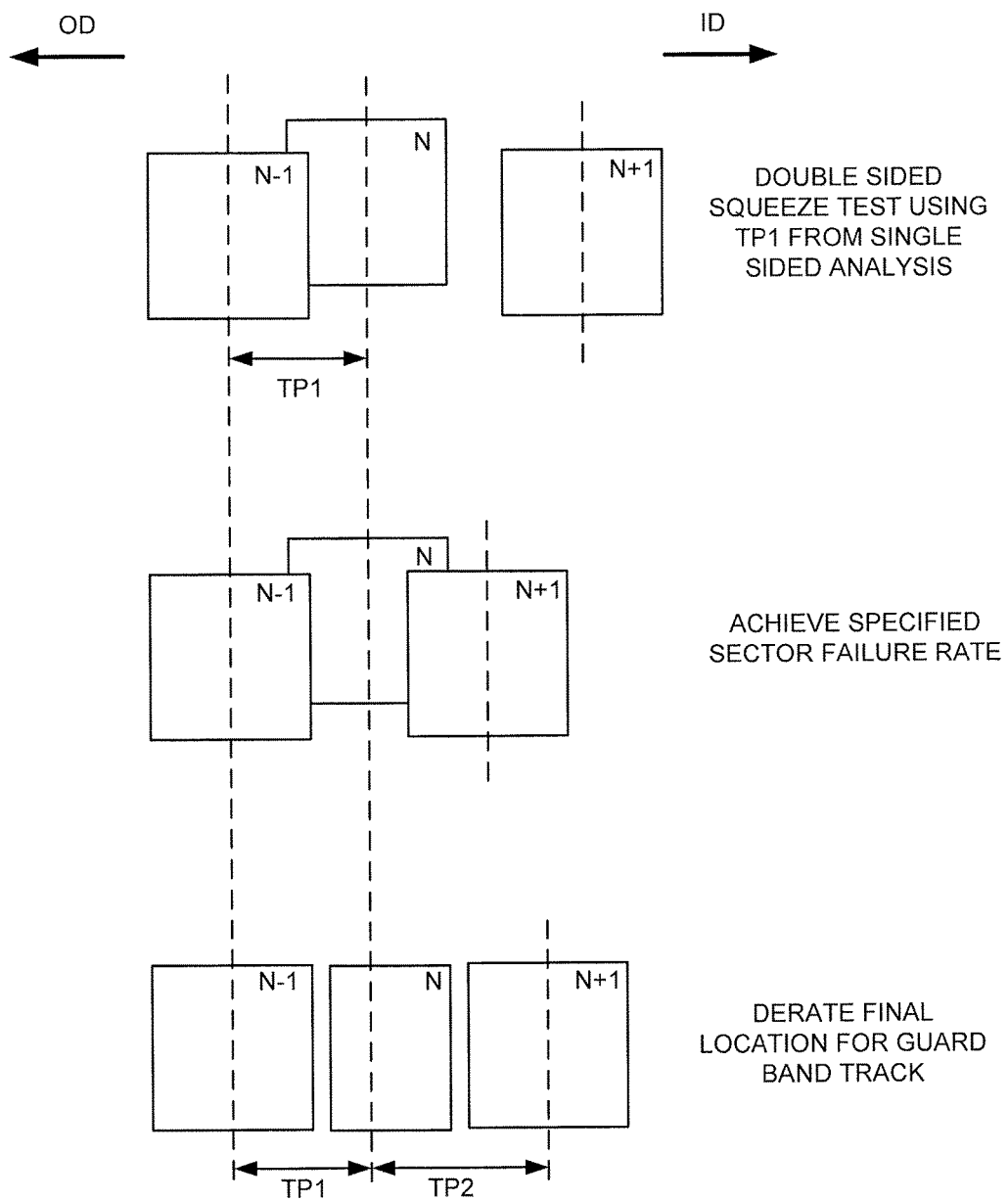
FIG. 11 depicts tracks evaluated using the routine of FIG. 10 in some embodiments.

This is illustrated in FIG. 11, which shows target track N and adjacent tracks N−1 and N+1. Using the example set forth above, the OD side adjacent track N−1 is written at the established intraband track pitch value TP1. The relative positioning of tracks N−1 and N is maintained constant during the evaluation. ID side adjacent track N+1 is thereafter advanced toward target track N until the specified error rate (e.g., sector failure rate, etc.) is achieved.

This results in a squeeze value as a percentage of normalized track pitch for the ID side adjacent track N+1. This value can be viewed as the value TPB in FIG. 7B (for the ID side). As before, an adjustment is made for the write fault threshold (WFT) to provide an overall SQZ-PCT value as follows:

$$SQZ\text{-}PCT = TPB - WFT \quad (7)$$

A value TPIC-DSS indicative of the double sided squeeze from the variable direction (in this case, ID) is given as:

$$TPIC\text{-}DSS = 1.0/(1.0 - (SQZ\text{-}PCT)) \quad (8)$$

and an intermediate track pitch value TP-D is determined as $$TP\text{-}D = 1.0/(TPIC\text{-}DSS) \quad (9)$$

The final second track pitch value TP2 for interband spacing (see FIG. 5) is thereafter calculated as follows:

$$TP2 = C[(TP\text{-}D) - (TP1)] + TP1 \quad (10)$$

In this way, the final second track pitch value TP2 that establishes the distance between the last track in one band and the first track in the next adjacent band is provided as the difference from the TP-D value and the TP1 value, multiplied by a constant multiplier C. The constant multiplier C accommodates various contingencies such as ability to withstand adjacent track interference (ATI). A value of C=1.5 provides more aggressive, higher density spacing with greater risks of ATI. A value of C=2.0 provides more margin but at the expense of less density. Any suitable constant value for C can be used.

From these values, it can now be seen that any given band on the disc using the foregoing calculations has a total band radial space BRS, or radial width across the disc, of:

$$BRS = [(TPB-1)(TP1)] + TP2 \quad (11)$$

where TPB represents the total number of tracks per band.

Returning again to the flow of FIG. 10, the final interband track pitch TP2 is determined at step 214 in accordance with the foregoing discussion, after which the determined track pitch values TP1 and TP2, as well as other parameters such as the direction of shingling, etc., are stored in a suitable memory for subsequent use during write operations at step 216.

At this point it will be appreciated that the routine of FIG. 10, as illustrated by FIG. 11, provides enhancements over prior art methodologies for calculating track pitch values for intraband (e.g., TP1) and interband (e.g., TP2) spacing. In some conventional methods, the respective TP1 and TP2 values are calculated independently; TP1 as shown in FIGS. 8A-9B and TP2 as shown in FIG. 7. By contrast, the methodology of FIGS. 10-11 makes the calculation of the interband track pitch value TP2 a function of TP1. This has been found through empirical analysis to provide significantly improved error rate performance and enhanced track densities.

Figure 12:
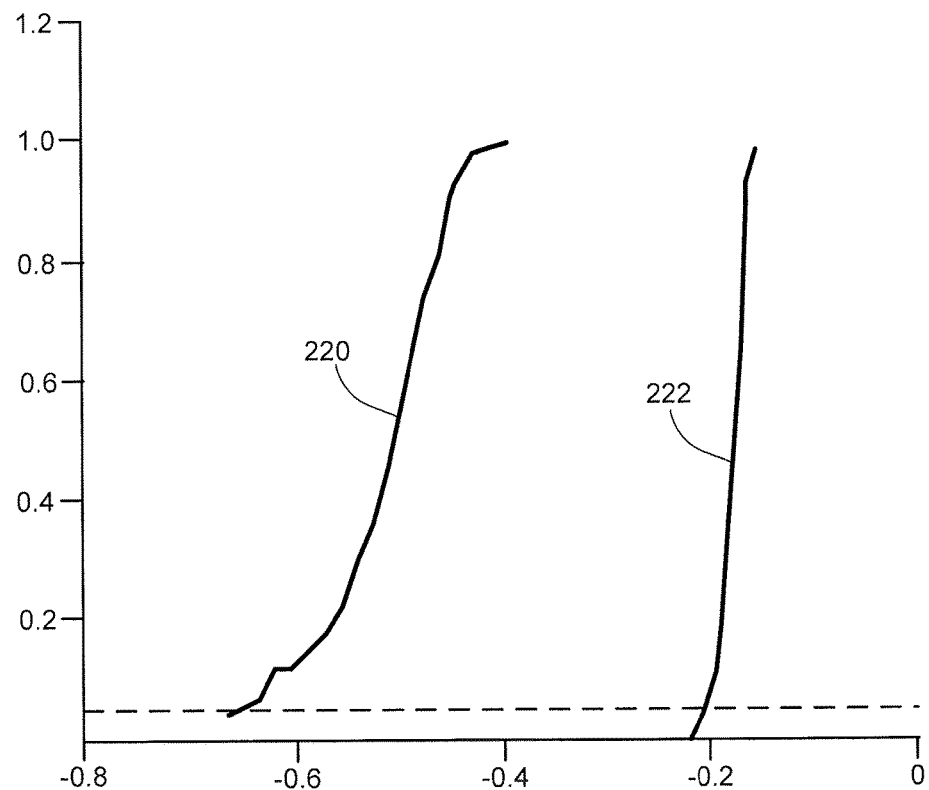
FIG. 12 is a graphical representation of test data showing improvements in track density and performance achieved using the routine of FIG. 10.

To this end, FIG. 12 is a graphical representation of empirical data obtained from evaluating real world HDDs in accordance with the foregoing discussion. FIG. 12 shows a first error performance curve 220 using the techniques disclosed above and a second error performance curve 222 using a conventional technique where a double sided squeeze test is performed (as in FIG. 7A-7B) to set the second track spacing value TP2 that is not a function of the TP1 value. Horizontal dashed curve corresponds to a specified minimum (normalized) sector failure rate (SFR) value.

As can be seen from FIG. 12, the proposed tuning methodology (curve 220) provides additional margin over the conventional methodology (curve 222). It is has been found that the proposed Inter-band TPIC_DSS tuning can saturate at the Target SFR. This is because when only one side of the test track is squeezed at TPIC_SSS, the SFR on the test track would be the same as the Target SFR. The squeeze percentage on the non-SMR side can continue to relax until the test track is no longer affected by ATI and the SFR does not change.

Further empirical analyses have demonstrated that the methodology as embodied herein can provide each track in a given band, including the first track, with nominally the same SFR performance. In one example, the first track in each band using the conventional method (curve 222) provided SFR degradation of about 55%, whereas the first track in each band using the disclosed method (curve 220) provided a negligible SFR degradation of about 0.12%.

Finally, further empirical analyses showed that in some cases, the constant multiplier C could be eliminated (e.g., C=1) altogether while maintaining specified levels of SFR for the first track in the adjacent band. This benefit significantly increases the total number of tracks that can be placed on a given medium compared to the existing methodology.

It will now be appreciated that the various embodiments presented herein can provide a number of benefits. Providing interband track pitch values (e.g., TP2) that are a function of the intraband track pitch values (e.g., TP1) has been found to significantly improve the error rate performance of the first track in each band while maintaining or improving the overall track density, and hence, data storage capacity, of the device. The methodology is particularly suited to shingled magnetic recording (SMR) systems in hard drives as well as other forms of storage devices.

It is to be understood that even though numerous characteristics and advantages of various embodiments of the present disclosure have been set forth in the foregoing description, together with details of the structure and function of various embodiments, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
    writing a first band of partially overlapping tracks to a rotatable recording medium at a first track pitch; and
    writing an adjacent second band of partially overlapping tracks to the rotatable recording medium at the first track pitch, the second band comprising a first written track that is adjacent a last written track in the first band, the first written track in the second band placed at a second track pitch from the last written track in the first band determined in response to an error rate established for a test track using an adjacent track written at the first track pitch.

2. The method of claim 1, further comprising:
    performing a first single sided track squeeze operation comprising writing a first target track on the medium, and repetitively writing a first adjacent track on a first selected side of the first target track with successively greater overlap distances on the first target track until a specified error rate value is obtained from the target track for a first final overlap distance;
    performing a second single sided track squeeze operation comprising writing a second target track on the medium, and repetitively writing a second adjacent track on an opposing, second selected side of the second target track at successively closer greater overlap distances on the second target track until the specified error rate value is obtained for a second final overlap distance; and selecting the first track pitch in relation to a greater one of the first final overlap distance or the second final overlap distance.

3. The method of claim 2, wherein the first track pitch is further selected in relation to a write fault threshold (WFT) value associated with the target track.

4. The method of claim 2, further comprising selecting a shingling direction for each of the tracks in the first band and in the second band responsive to the greater one of the first final overlap distance or the second final overlap distance.

5. The method of claim 2, further comprising:
performing a double sided track squeeze operation comprising writing a third test track on the medium, writing a third adjacent track at the first track pitch with respect to the third test track on the first selected side or the second selected side of the target track corresponding to the greater one of the first final overlap distance or the second final overlap distance, and repetitively writing a fourth adjacent track on the remaining one of the first selected side or the second selected side of the target track at successively greater overlap distances on the third target track until the specified error rate value is obtained for a third final overlap distance; and
selecting the second track pitch in relation to the third final overlap distance and the first track pitch.

6. The method of claim 1, further comprising prior steps of:
writing a test pattern to a test track at a selected location on the medium;
writing a first adjacent track that partially overlaps the test track in a first radial direction of the medium at the first track pitch value;
while maintaining the first adjacent track at the first track pitch with respect to the test track, performing steps of writing a second adjacent track that partially overlaps the test track in an opposing second radial direction of the medium, measuring an initial error rate value from the test track, and repetitively advancing the second adjacent track toward the test track by rewriting the second adjacent track and determining an updated error rate value from the test track until a specified error rate value for the target track is reached at a final squeeze distance for the second adjacent track; and
determining the second track pitch value responsive to the final squeeze distance.

7. A method comprising sequential steps of:
writing a test pattern to a test track using a data transducer adjacent a rotatable data recording medium;
writing a first adjacent track that partially overlaps the test track in a first radial direction of the medium at a first track pitch value;
while maintaining the first adjacent track at the first track pitch with respect to the test track, performing steps of writing a second adjacent track that partially overlaps the test track in an opposing second radial direction of the medium, measuring an initial error rate value from the test track, and repetitively advancing the second adjacent track toward the test track by rewriting the second adjacent track and determining an updated error rate value from the test track until a specified error rate value for the target track is reached at a final squeeze distance for the second adjacent track;
determining a second track pitch value responsive to the final squeeze distance; and
writing first and second bands of partially overlapping tracks to the medium, each of the tracks in the respective first and second bands written at the first track pitch, a last track in the first band and a first track in second band written at the second track pitch.

8. The method of claim 7, further comprising prior steps of:
performing a first single sided track squeeze operation comprising writing a first target track on the medium, and repetitively writing a first adjacent track on a first selected side of the first target track with successively greater overlap distances on the first target track until a specified error rate value is obtained from the target track for a first final overlap distance;
performing a second single sided track squeeze operation comprising writing a second target track on the medium, and repetitively writing a second adjacent track on an opposing, second selected side of the second target track at successively closer greater overlap distances on the second target track until the specified error rate value is obtained for a second final overlap distance; and
selecting the first track pitch in relation to a greater one of the first final overlap distance or the second final overlap distance.

9. The method of claim 7, wherein the first track pitch is further selected in relation to a write fault threshold (WFT) value associated with the target track.

10. The method of claim 7, further comprising selecting a shingling direction for each of the tracks in the first band and in the second band responsive to the greater one of the first final overlap distance or the second final overlap distance.

11. The method of claim 7, wherein the first track pitch is determined by prior steps comprising:
writing a test pattern to a test track on the medium;
writing a third adjacent track that partially overlaps the test track in the first radial direction of the medium;
reading the test pattern from the test track to determine an initial error rate value;
repetitively advancing the third adjacent track toward the test track by rewriting the third adjacent track and determining an updated error rate value until a specified error rate value for the target track is reached at a first final squeeze distance for the third adjacent track;
rewriting the test pattern to the test track;
writing a fourth adjacent track that partially overlaps the test track in the opposing second radial direction of the medium;
reading the test pattern from the test track to determine an initial error rate value;
repetitively advancing the fourth adjacent track toward the test track by rewriting the fourth adjacent track and determining an updated error rate value until a specified error rate value for the target track is reached at a second final squeeze distance for the third adjacent track; and
selecting the first track pitch in relation to a greater one of the first final squeeze distance or the second final squeeze distance.

12. The method of claim 7, wherein the second track pitch is greater than, and is a function of, the first track pitch.

13. The method of claim 7, wherein the medium is a rotatable magnetic recording disc.

14. A data storage device comprising:
a data read/write transducer controllably positionable adjacent a rotatable data recording medium;
a control circuit configured to write a first band of partially overlapping tracks to the medium at a first track pitch comprising a distance between a center of a first track and a center of a second track in said first band, and to subsequently write an adjacent second band of partially overlapping tracks to the rotatable recording medium at the first track pitch, the second band of partially overlapping tracks comprising a first written track adjacent a last written track in the first band of partially overlapping tracks, the first written track in the second band placed by the control circuit at a second track pitch from the last written track in the first band greater than the first track pitch; and a track pitch determination circuit configured to select the first track pitch using a single sided track squeeze operation and configured to select the second track pitch using a double sided track squeeze operation that maintains a first adjacent track at the first track pitch with respect to a target track while adjusting a position of an opposing second adjacent track with respect to the target track.

15. The data storage device of claim 14, wherein the track pitch determination circuit comprises a programmable processor with associated programming stored in a memory location which, when executed by the processor, performs the single sided track squeeze operation by:

writing a test pattern to a second test track;

writing a third adjacent track that partially overlaps the second test track in a first radial direction of the medium;

reading the test pattern from the second test track to determine an initial error rate value;

repetitively advancing the third adjacent track toward the second test track by rewriting the third adjacent track and determining an updated error rate value until a specified error rate value for the second target track is reached at a first final squeeze distance for the third adjacent track;

rewriting the test pattern to the second test track;

writing a fourth adjacent track that partially overlaps the second test track in the opposing second radial direction of the medium;

reading the test pattern from the second test track to determine an initial error rate value;

repetitively advancing the fourth adjacent track toward the second test track by rewriting the fourth adjacent track and determining an updated error rate value until a specified error rate value for the second target track is reached at a second final squeeze distance for the third adjacent track; and selecting the first track pitch in relation to a greater one of the first final squeeze distance or the second final squeeze distance.

16. The data storage device of claim 15, wherein the first track pitch is further selected in relation to a write fault threshold (WFT) value associated with the second target track.

17. The data storage device of claim 15, wherein the track pitch determination circuit is further configured to select a shingling direction for each of the tracks in the first band and in the second band responsive to the greater one of the first final squeeze distance or the second final squeeze distance.

18. The data storage device of claim 14, wherein the data recording medium is a magnetic recording disc.

19. The data storage device of claim 14, wherein the track pitch determination circuit further operates to arrange the medium into a plurality of concentric zones and to determine a first track pitch value, a second track pitch value and a shingling direction for use in writing bands of partially overlapping tracks in each of the zones.

20. The data storage device of claim 14, characterized as a hard disc drive (HDD), the control circuit comprising a programmable controller circuit, a read/write channel and a servo control circuit.

* * * * *